United States Patent Office 2,839,313
Patented June 17, 1958

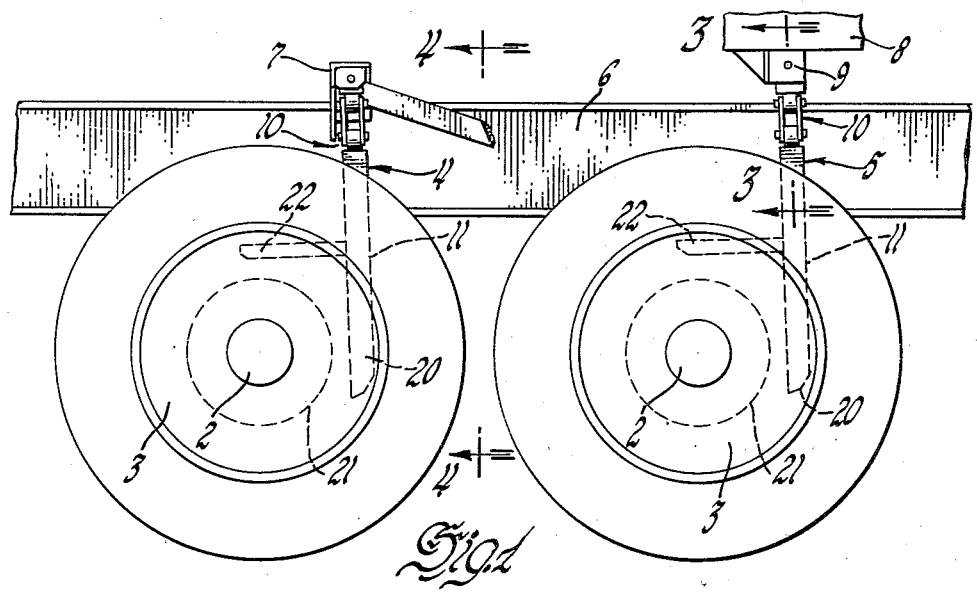
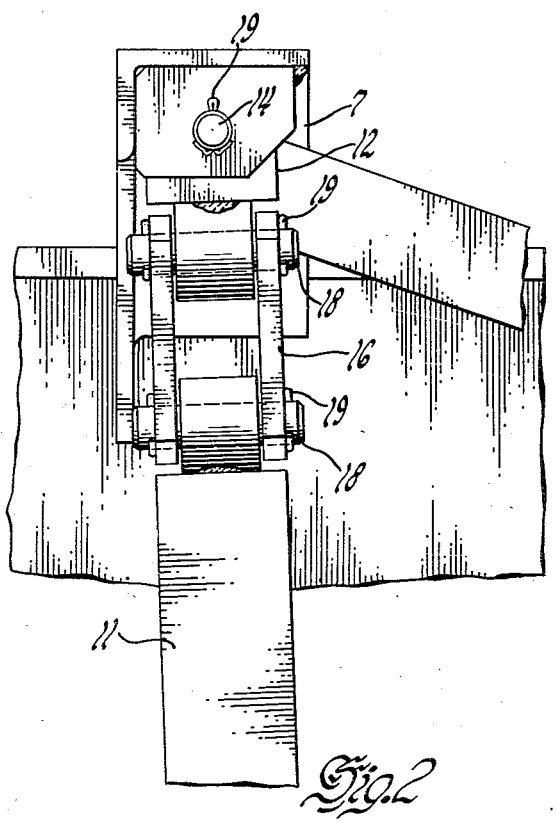
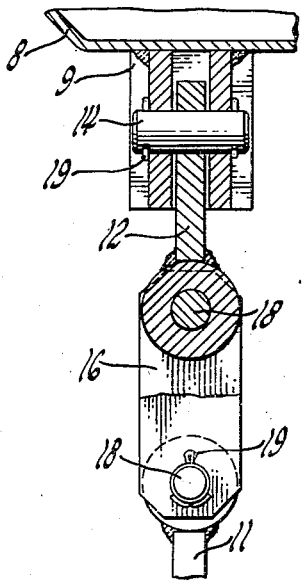

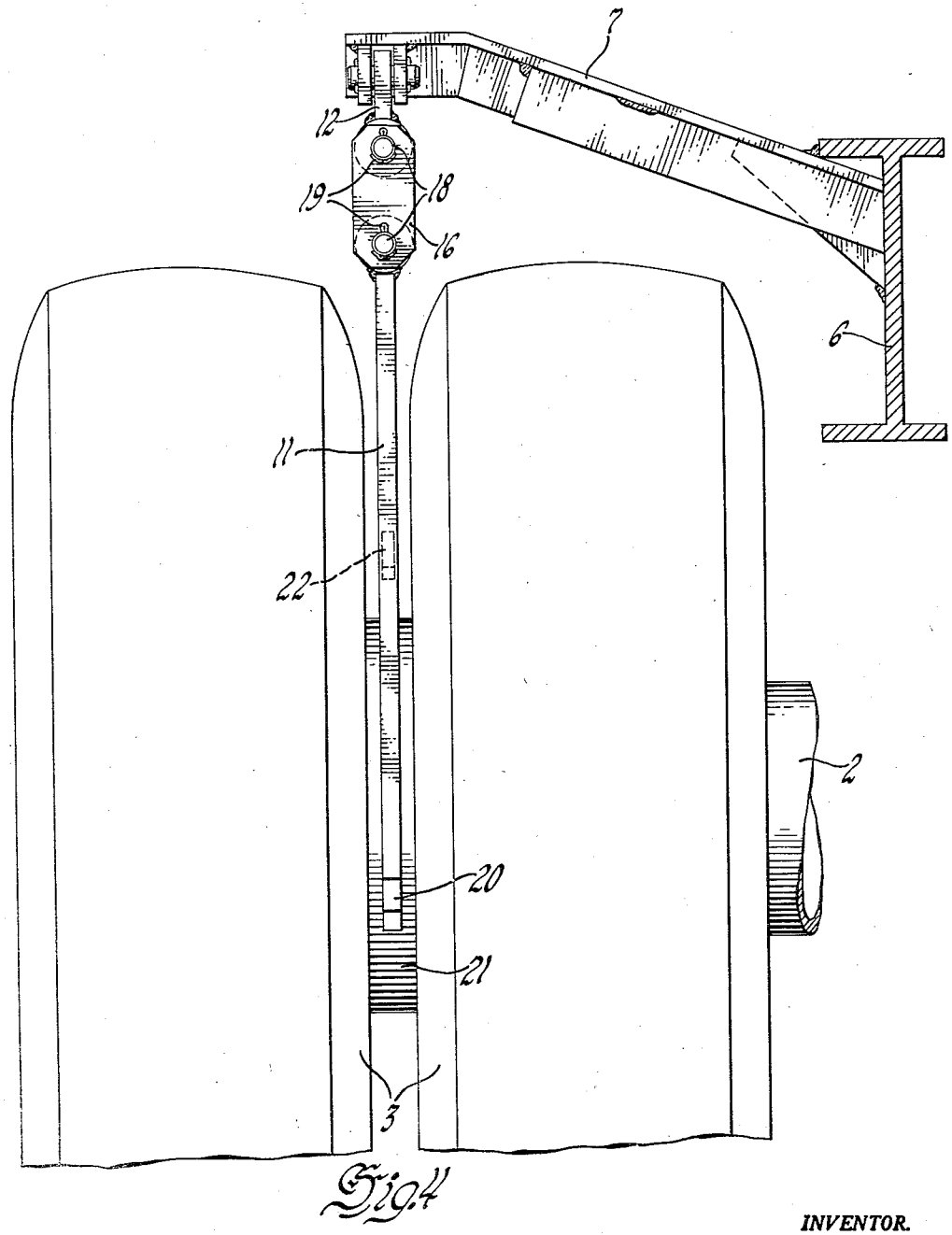

2,839,313

DOUBLE ARTICULATED ROCK EJECTOR FOR VEHICLE DUAL WHEELS

John A. Walko, Cleveland, Ohio, assignor to General Motors Corporation, Detroit, Mich., a corporation of Delaware Application January 24, 1957, Serial No. 636,129

9 Claims. (Cl. 280—158)

This invention relates to a means for ejecting rocks and other materials from vehicle wheels and, more particularly, to an ejector bar depending vertically from a vehicle frame between two laterally spaced vehicle wheels.

Rock ejectors of the general nature herein described have been used as an accessory for trucks and other vehicles to eject rocks which become lodged between the dual wheels of such a vehicle to prevent unbalance of the wheels and tire wear resulting therefrom. Another advantage of such ejectors is that they may cam rocks upwardly from between the dual wheels against the underside of the vehicle body thereby preventing damage to a following vehicle which might occur if the rocks were thrown from the tires by centrifugal force.

Rock ejectors have typically comprised a depending bar pivotally mounted to a vehicle frame for fore and aft swinging movement between dual vehicle tires. However, where the vehicle is equipped with a bogie type suspension, each pair of dual wheels oscillates in an arcuate path relative to the vehicle frame. As a result of such movement, the depending ejector bar is caused to forcibly engage the tires of the dual vehicle thereby often damaging them seriously.

The present invention avoids this serious difficulty with previously known ejectors by providing a supporting linkage for the ejector bar hanging between the vehicle wheels which includes a double-articulated link which is capable of transverse swinging movement to shift the ejector bar laterally to adjust to the arcuate movement of the wheels without coming into damaging contact with the vehicle tires.

The rock ejector of this invention may comprise a supporting link pivotally connected to a vehicle frame by a transversely extending pivot pin for fore and aft swinging movement of the ejector bar between the vehicle wheels. Furthermore, an intermediate link pivotally interconnects the supporting link and ejector bar by two vertically spaced, longitudinally extending pivot pins which will permit the intermediate link to swing laterally or transversely relative to the supporting link and ejector bar. As a result of this double articulation of the intermediate link, the subtantially vertically depending ejector bar may shift laterally to remain substantially midway between the vehicle wheels to accommodate the arcuate oscillatory movement of the latter relative to the vehicle frame from which the ejector is suspended.

These and other advantages of this invention will appear more fully hereinafter, reference being made to the drawings in which:

Figure 1 is a side elevation of a vehicle having tandem axles with dual wheels and equipped with the rock ejector;

Figure 2 is an enlarged view of the ejector bar linkage of Figure 1;

Figure 3 is an enlarged cross section partly broken away on line 3—3 of Figure 1;

Figure 4 is a rear elevation of the ejector bar taken on line 4—4 of Figure 1.

In Figure 1 of the drawings there is shown an automotive vehicle having tandem axles 2 and dual vehicle wheels 3 on which tires are mounted in the usual manner. The rock ejector assemblies 4 and 5 are identical and may be suspended, respectively, from the vehicle frame 6 by a bracket structure 7 or from an overhanging portion 8 of the vehicle by a bracket 9. Inasmuch as the rock ejector assemblies are identical, like numerals are used in the various views of the two assemblies to indicate identical parts thereof.

The rock ejectors 4 and 5 each include a supporting linkage 10 operatively connected to a bracket secured to a vehicle to support the substantially vertically depending ejector bar 11 between the dual vehicle wheels 3 for fore and aft and transverse or lateral swinging or shifting movement. The supporting linkage comprises a support link 12 pivotally connected to a respective bracket for fore and aft swinging movement relative thereto by means of a transversely extending pivot pin 14. An intermediate link 16 is pivotally connected by the vertically spaced, longitudinally extending pivot pin 18 to the lower end of support link 12 and upper end of ejector bar 11. Suitable means, such as cotter pins 19, may be used to retain the various pivot pins in position.

The lower end 20 of the ejector bar is preferably disposed to the rear of a wheel spacing member 21 and is of sufficient length to engage this member upon a rock or other material striking the bar. As a result, the rock so striking the ejector bar will be cammed from between the vehicle wheels. Alternatively, any other suitable stop means may be utilized to limit forward movement of the ejector bar or its supporting means to aid in camming a rock from between the wheels. For example, a stop plate may be formed integral with the respective brackets 7 and 9 so as to extend downwardly forwardly of the ejector bar or its supporting means so as to limit forward swinging movement of the ejector bar in dislodging the rock or other material from between the tires.

It will be apparent that the intermediate link, being doubly articulated by the vertically spaced pins 18 to the support link 12 and ejector bar 11, will permit lateral shifting movement of the substantially vertically depending bar to adjust its position as the dual vehicle wheels oscillate relative to the vehicle frame. While the double articulated structure aforedescribed will provide lateral shifting movement of the bar 11 without causing the latter to be forced into engagement with a vehicle tire, the bar 11 may have mounted thereon a horizontal forwardly extending guide bar 22 which overlies the spacer member 21. The guide bar 22 is so positioned relative to the spacer member 21 and degree of arcuate wheel movement to be accommodated so as to be engaged by the spacer members during such movement to lift bar 11 and articulate the link 16.

The support link 12 is preferably pivotally connected to its associated bracket in substantially a vertical plane running parallel to the dual vehicle wheels and between them when in a static condition, the double articulated link being long enough to accommodate the greatest degree of relative oscillatory movement between the vehicle wheels and frame. Such a construction, and particularly the use of the double articulated supporting linkage, will preclude any possibility of the ejector bar being forced with considerable pressure against the surface of a vehicle tire as would be possible if there were only one longitudinal pivotal axis which would cause the ejector bar to assume an angular attitude between the dual wheels thereby forcibly engaging and damaging the vehicle tires upon the relative movement between the wheels and frame becoming large enough. Moreover, it will be apparent that the double articulated arrangement of this invention may be used without modification on a vehicle employing any type of suspension, although it is specifically designed to avoid the problems hereinabove set forth with regard to suspensions in which the dual vehicle wheels oscillate in an arcuate path relative to the vehicle frame.

I claim:

1. A rock ejector for use with a vehicle having dual vehicle wheels comprising, an ejector bar, a link structure supporting said bar from the vehicle, said link structure including link means articulated at a plurality of spaced points for transverse swinging movement of at least a portion of said link structure relative to said bar.

2. A rock ejector for use with a vehicle having dual wheels comprising, an ejector bar, a link structure supporting said bar from the vehicle, said structure including a plurality of spaced longitudinally extending articulated joints for transverse swinging movement of at least a portion of said structure between said joints relative to said bar.

3. A rock ejector for use with dual vehicle wheels comprising, an ejector bar vertically depending between said dual wheels, means for supporting said bar from said vehicle for fore and aft swinging movement, said means including a double articulated link capable of transverse swinging movement relative to said ejector bar and stop means limiting forward movement of said bar.

4. A rock ejector for use with dual vehicle wheels comprising, an ejector bar vertically depending between said dual wheels, a supporting link pivotally mounted on said vehicle for fore and aft swinging movement, a transversely swingable intermediate link pivotally mounted at one end to said supporting link and at the other end to said bar, whereby said bar may shift laterally, and stop means limiting forward movement of said bar.

5. A rock ejector for use with dual vehicle wheels comprising, an ejector bar vertically depending between said dual wheels, a support link mounted on said vehicle by a transversely extending pivot for fore and aft swinging movement, an intermediate link pivoted at one end to said support link and at the other end to said ejector bar by vertically spaced, longitudinally extending pivotal connections for transverse swinging movement of said intermediate link relative to said bar and support link, and stop means limiting forward movement of said bar.

6. A rock ejector for use with a vehicle having dual vehicle wheels and a member spacing said wheels apart, said ejector comprising an ejector bar depending between said wheels, a link structure supporting said bar from the vehicle, said link structure including means articulated at a plurality of spaced points for transverse swinging movement of at least a portion of said link structure relative to said bar, and a guide bar carried by said ejector bar in spaced relation from said member.

7. A rock ejector for use with a vehicle having dual vehicle wheels and a member spacing said wheels apart, said ejector comprising an ejector bar depending between said wheels, a link structure supporting said bar from the vehicle, said structure including a plurality of spaced longitudinally extending articulated joints for transverse swinging movement of at least a portion of said structure between said joints relative to said bar, and a guide bar carried by said ejector bar in spaced relation relative to said member.

8. A rock ejector for use with a vehicle having dual vehicle wheels and a member spacing said wheels apart, said ejector comprising an ejector bar vertically depending between said dual wheels, a supporting link pivotally mounted on said vehicle for fore and aft swinging movement, a transversely swingable intermediate link pivotally mounted at one end to said supporting link and at the other end to said bar whereby said bar may shift laterally, a guide bar carried by said ejector bar and engageable by said spacing member to shift said ejector bar laterally, and stop means limiting forward movement of said bar.

9. A rock ejector for use with a vehicle having dual vehicle wheels and a member spacing said wheels apart, said ejector comprising an ejector bar vertically depending between said dual wheels, a support link mounted on said vehicle by a transversely extending pivot for fore and aft swinging movement, an intermediate link pivoted at one end to said support link and at the other end to said ejector bar by vertically spaced longitudinally extending pivotal connections for transverse swinging movement of said intermediate link relative to said bar and support link, a guide bar carried by said ejector bar and engageable by said spacing member to swing said intermediate link transversely, and stop means limiting forward movement of said bar.

References Cited in the file of this patent

UNITED STATES PATENTS 2,738,986    Pelton  ---------------  Mar. 20, 1956